Levi Moore.
Trap.
Nº 92,631.    Patented July 13. 1869.
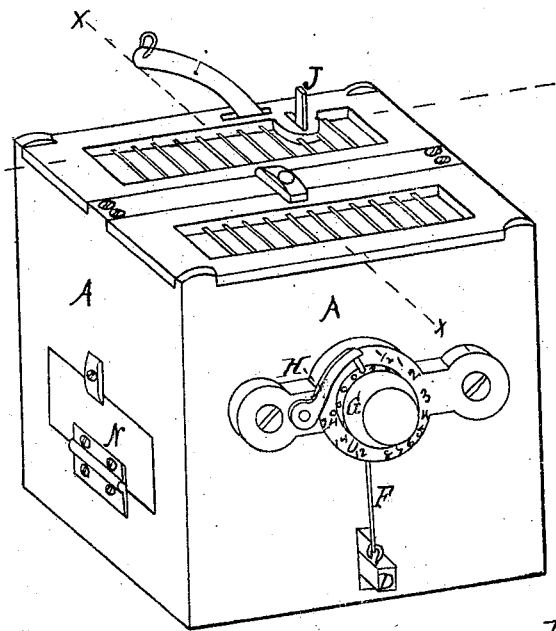
Fig: 1.
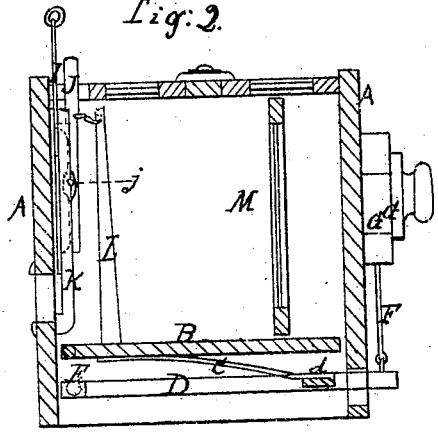
Fig: 2.
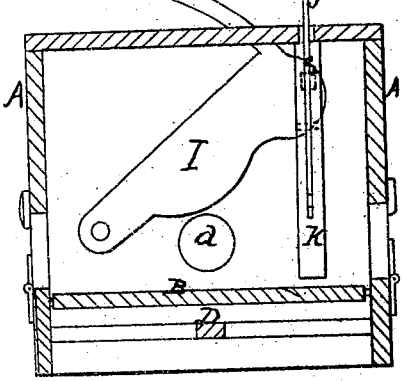
Fig: 3.
Witnesses
H. S. Sprague.
Jas. I. Duy.
Inventor
Levi Moore
per attorney
Thos. S. Sprague.

United States Patent Office.

LEVI MOORE, OF BARABOO, WISCONSIN.

Letters Patent No. 92,631, dated July 13, 1869.

IMPROVED ANIMAL-TRAP.

The Schedule referred to in these Letters Patent and making part of the same.

*To whom it may concern:*

Be it known that I, LEVI MOORE, of Baraboo, in the county of Sauk, and State of Wisconsin, have invented a new and useful Improvement in Animal-Traps; and I do declare that the following is a true and accurate description thereof, reference being had to the accompanying drawings, and to the letters of reference marked thereon, and being a part of this specification.

Figure 1 is a perspective view of my trap, from the rear side;

Figure 2 is a cross-section on the line $x$–$x$ in fig. 1; and

Figure 3 is an elevation of the interior of the front.

The nature of this invention relates to an improvement in the construction of animal-traps, so arranged that the entrance will close as soon as a given weight of the animals is on the floor of the trap, the resistance to the weight being varied as circumstances may require, and in the general arrangement of its parts, as hereinafter more fully shown and set forth.

In the drawings—

A represents the sides of my improved trap, and B a tilting-floor, hinged at its front sides to the frame, which is supported in its horizontal position by semi-elliptic springs C, secured to a cross-bar, $d$, of the vibrating lever D, hinged to a rock-shaft, E, journalled into the ends of the trap, under the floor. The free end of the lever D projects through a slot in the rear side of the frame, as shown in fig. 1, and has attached to it a wire or cord, F, secured to and wound over a ratcheted drum, G, secured in any desired position, by a pawl, H. By winding up the wire on the drum, a greater upward pressure is exerted by the springs, on the under side of the floor. The face of the bearing of the drum is divided off into lines, denoting ounces, or other convenient measures of weight, an index on the periphery of the drum indicating the weight required on the floor to spring the trap.

I is a door, of sheet-metal, pivoted at one end to the inner side of the front of the trap, closing the entrance $a$, and is provided with a quadrant, $i$, for conveniently raising it.

J is a vertical latch, pivoted in a post, K, near the front side, the door moving freely between the post and the front side.

A pin, or stud, $j$, projects from the face of the latch, and supports the door, when raised for setting the trap.

L is a post, secured to and vibrating with the floor, near the latch, to the upper part of which it is connected by a proper link, so that when the floor is tilted downward by any sufficient weight, the post tilts back, and withdraws the latch from the door, which then falls, securing the animals within.

M is a grated feed-rack, behind which the bait is placed, through an opening in the top of the trap.

Suitable doors, N, are in the ends of the trap, for removing the animals when caught.

As it is well known that rats and many other animals will congregate in numbers around food which they cannot remove from the place in which it is found, the tension of the springs may be regulated so that the door will not fall until a given number are in the trap.

What I claim as my invention, and desire to secure by Letters Patent, is—

1. In animal-traps, the tilting-floor B, post L, springs C, lever D, rock-shaft E, cord F, drum G, and pawl H, arranged and operating substantially as and for the purposes set forth.

2. The door I, latch J, in connection with the post L, or other tripping-device, attached to the tilting-floor, when arranged and operating substantially as and for the purposes set forth.

LEVI MOORE.

Witnesses:
T. T. ENGLISH,
BENJN. L. PURCH.